(12) United States Patent
Chiu et al.

(10) Patent No.: US 9,390,661 B2
(45) Date of Patent: Jul. 12, 2016

(54) DISPLAY CONTROLLER SYSTEM

(71) Applicant: SIPIX IMAGING, INC., Fremont, CA (US)

(72) Inventors: Wen-Pin Chiu, Taoyuan (TW); Craig Lin, San Jose, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 258 days.

(21) Appl. No.: 13/828,370

(22) Filed: Mar. 14, 2013

(65) Prior Publication Data
US 2013/0222404 A1    Aug. 29, 2013

Related U.S. Application Data

(63) Continuation-in-part of application No. 12/882,094, filed on Sep. 14, 2010, now abandoned.

(60) Provisional application No. 61/242,680, filed on Sep. 15, 2009.

(51) Int. Cl.
*G06F 13/00* (2006.01)
*G09G 3/34* (2006.01)
*G09G 5/399* (2006.01)

(52) U.S. Cl.
CPC ............... *G09G 3/344* (2013.01); *G09G 5/399* (2013.01); *G09G 2340/16* (2013.01)

(58) Field of Classification Search
None
See application file for complete search history.

(56) References Cited

U.S. PATENT DOCUMENTS

| | | | |
|---|---|---|---|
| 5,652,605 A | 7/1997 | Nishioka et al. | |
| 6,208,772 B1 * | 3/2001 | Wilt | G06F 13/4027 382/303 |
| 6,271,866 B1 | 8/2001 | Hancock et al. | |
| 6,744,919 B2 | 6/2004 | Said | |
| 7,012,600 B2 * | 3/2006 | Zehner et al. | 345/214 |
| 7,737,984 B2 | 6/2010 | Hancock et al. | |
| 7,768,678 B2 | 8/2010 | Nacman et al. | |
| 2005/0195203 A1 * | 9/2005 | Sadanand et al. | 345/536 |
| 2006/0061577 A1 | 3/2006 | Subramaniam | |
| 2006/0291032 A1 * | 12/2006 | Zhou et al. | 359/296 |
| 2007/0080971 A1 | 4/2007 | Sung | |
| 2008/0062201 A1 | 3/2008 | Bhatia et al. | |
| 2009/0256868 A1 * | 10/2009 | Low et al. | 345/691 |
| 2010/0265260 A1 * | 10/2010 | Swic | G09G 5/399 345/539 |
| 2011/0007056 A1 * | 1/2011 | Huitema | 345/211 |
| 2011/0063314 A1 | 3/2011 | Chiu et al. | |
| 2013/0272528 A1 * | 10/2013 | Bushen et al. | 381/18 |

OTHER PUBLICATIONS

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

* cited by examiner

*Primary Examiner* — William Beutel
(74) *Attorney, Agent, or Firm* — Perkins Coie LLP

(57) ABSTRACT

A display controller system with a memory controller and buffers is described.

The system enables transferring data from the main memory of the CPU to the image memory without interfering the image updating. As a result, the present invention may allow continuously updating the display image and continuously writing new image data from CPU to the image memory which improves overall system performance.

8 Claims, 9 Drawing Sheets

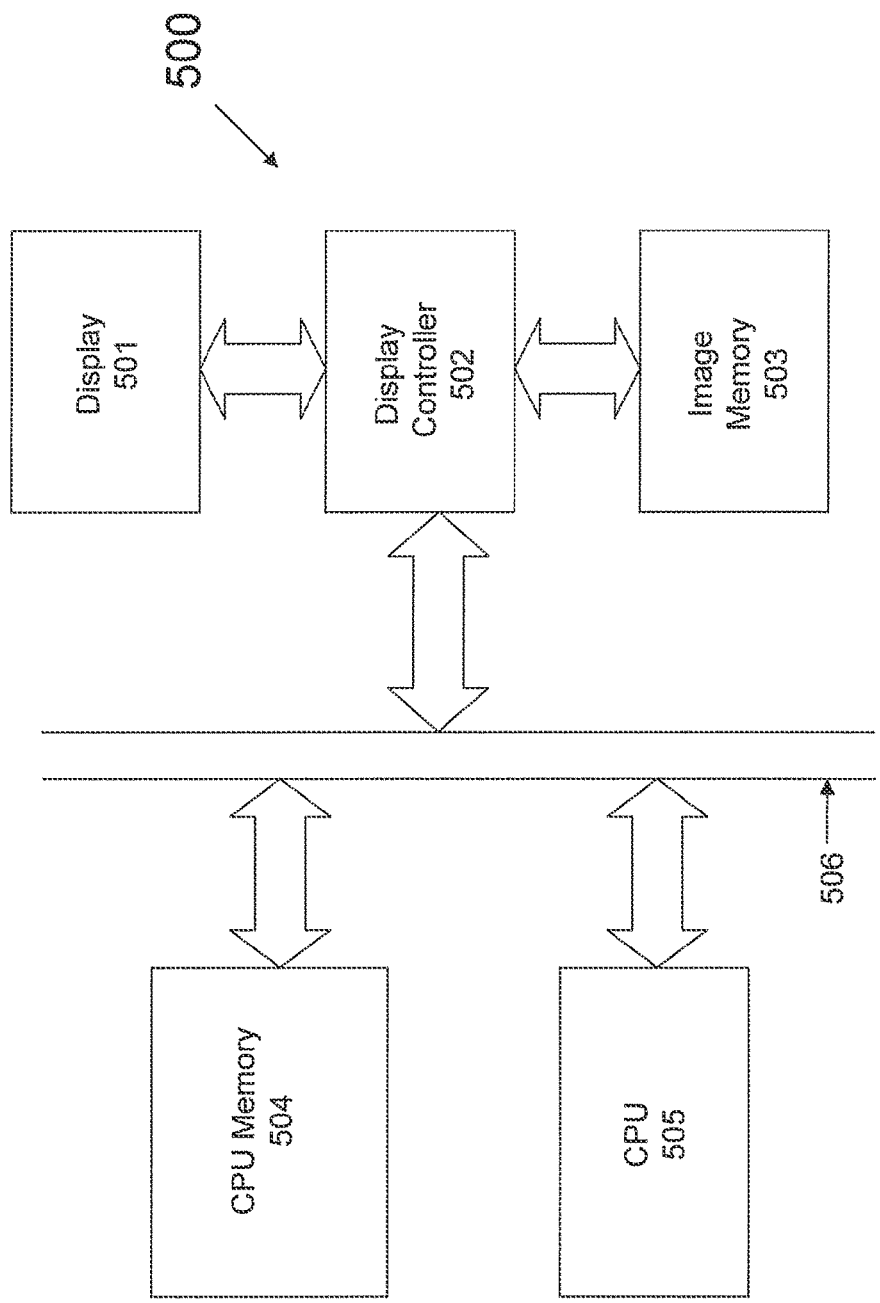

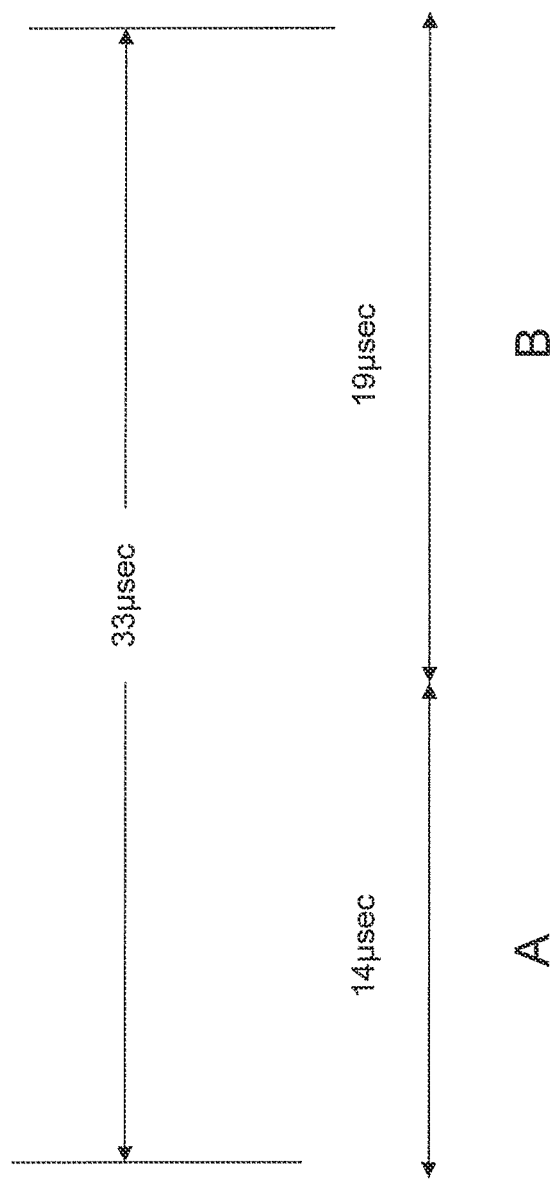

DISPLAY CONTROLLER SYSTEM

DISPLAY CONTROLLER SYSTEM

This application is a continuation-in-part of U.S. non-Provisional application Ser. No. 12/882,094, filed on Sep. 14, 2010 which claims priority to U.S. Provisional Application No. 61/242,680, filed Sep. 15, 2009; the content of which is incorporated herein by reference in its entirety.

TECHNICAL FIELD

The present invention relates to a display controller system and a method of transferring data from the main memory of a CPU to a display device, in particular, an electrophoretic display.

BACKGROUND OF THE INVENTION

An electrophoretic display (EPD) is a non-emissive device based on the electrophoresis phenomenon of charged pigment particles suspended in a solvent. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to obtain a desired image, driving waveforms are required for an electrophoretic display. A driving waveform consists of a series of voltages applied to a pixel to allow migration of the pigment particles in the electrophoretic fluid. For an image of 600×800 pixels, there is a tremendous amount of image data and waveforms that need to be processed in a given time period. While the images are being constantly updated, in the method currently used, the central processing unit of a computer must wait until an image update is completed before the display controller can receive additional image data. This method has the disadvantage of delaying processing the image data, thus causing slow-down of the entire system.

SUMMARY OF THE INVENTION

The first aspect of the present invention is directed to a display controller system for transferring image data to a display wherein the display controller comprises a memory controller, a first buffer and a second buffer, and the memory controller transfers data from one of the buffers which is full, to an image memory.

In one embodiment, the memory controller determines if image data from a CPU memory is transferred to the first buffer or the second buffer. In one embodiment, the two buffers operate as ping-pong buffers. In one embodiment, the display controller further comprises a display controller CPU and a look-up table. In one embodiment, the image memory has at least three spaces.

The second aspect of the present invention is directed to a method of transferring data for a display device, which method comprises:
(A) (i) accessing current and next image data from an image memory and comparing the two images,
(ii) finding the appropriate driving waveforms, one for each of the pixels in a given line, from a lookup table,
(iii) forwarding to a display voltage data to be applied to each of the pixels in said given line; and
(B) (i) transferring image data from a buffer which is full to the image memory, and
both steps A and B are completed within a line updating time period.

In one embodiment, during multiple line updating time periods, Steps A and B repeat and are carried out in an interleaving manner. In one embodiment, in a line updating time period, Step B is skipped. In one embodiment, the display is an electrophoretic display. In one embodiment, the line updating time period is calculated from a frame time divided by the number of lines of pixels.

The third aspect of the present invention is directed to a display system comprising:
an electrophoretic display;
a display controller comprising a memory controller and two buffers; and
an image memory.

The display controller system and method of the present invention enables transferring data from the main memory of the CPU to the image memory without interfering the image updating. As a result, the present invention may allow continuously updating the display image and continuously writing new image data from CPU to the image memory, which improves overall system performance.

BRIEF DESCRIPTION OF THE DRAWINGS

FIG. 5a illustrates an operating system for a display device.
FIGS. 7a-7c illustrate methods of the present invention for transferring image data.

DETAILED DESCRIPTION OF THE INVENTION

Figure 1:
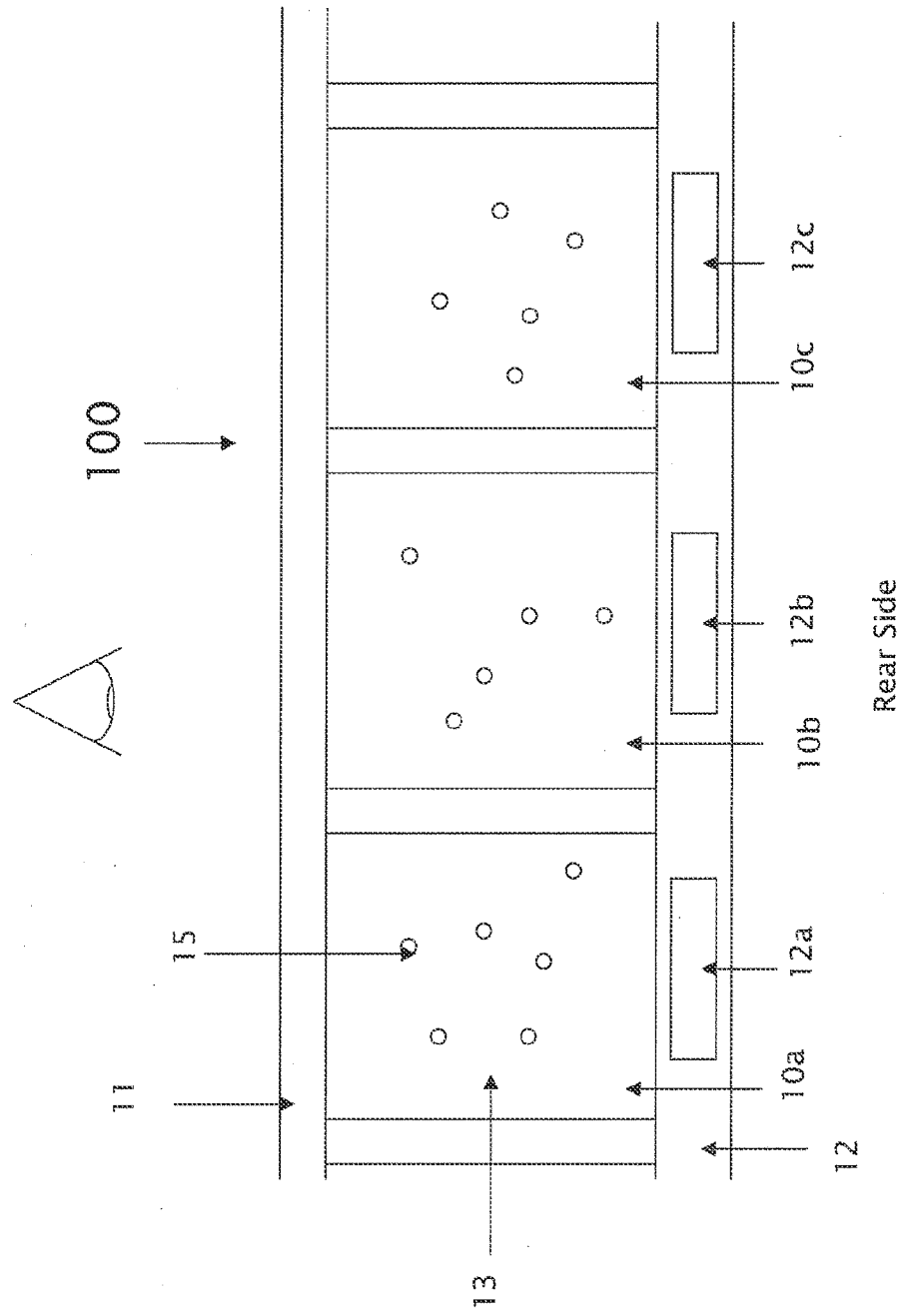
FIG. 1 is a cross-section view of a typical electrophoretic display device.

FIG. 1 illustrates a typical electrophoretic display 100 comprising a plurality of electrophoretic display cells 10a, 10b and 10c. In FIG. 1, the electrophoretic display cells 10a, 10b, 10c, on the front viewing side indicated with the graphic eye, are provided with a common electrode 11 (which is usually transparent and therefore on the viewing side). On the opposing side (i.e., the rear side) of the electrophoretic display cells 10a, 10b and 10c, a substrate (12) includes discrete pixel electrodes 12a, 12b and 12c, respectively. Each of the pixel electrodes defines an individual pixel of the electrophoretic display. In practice, a single display cell may be associated with one discrete pixel electrode or a plurality of display cells may be associated with one discrete pixel electrode.

An electrophoretic fluid 13 comprising charged pigment particles 15 dispersed in a solvent is filled in each of the display cells. The movement of the charged particles in a display cell is determined by the voltage potential difference applied to the common electrode and the pixel electrode associated with the display cell in which the charged particles are filled. For example, in a binary system where positively charged white particles are dispersed in a black solvent, when no voltage is applied to a common electrode and a voltage of +15V is applied to a pixel electrode, the driving voltage for the charged pigment particles in the area of the pixel would be +15V. In this case, the driving voltage would move the white particles to be near or at the common electrode and as a result, the white color is seen through the common electrode (i.e., the viewing side). Alternatively, when no voltage is applied to a common electrode and a voltage of −15V is applied to a pixel electrode, the driving voltage in this case would be −15V and under such −15V driving voltage, the positively charged white particles would move to be at or near the pixel electrode, causing the color of the solvent (black) to be seen at the viewing side.

If there is only one type of pigment particles in the electrophoretic fluid, the pigment particles may be positively charged or negatively charged. In another embodiment, the electrophoretic display fluid may have a transparent or lightly colored solvent or solvent mixture and charged particles of two different colors carrying opposite particle charges, and/or having differing electro-kinetic properties.

The display cells may be of a conventional walled or partition type, a microencapsulated type or a microcup type. In the microcup type, the electrophoretic display cells may be sealed with a top sealing layer. There may also be an adhesive layer between the electrophoretic display cells and the common electrode.

The term "display cell" is intended to refer to a microcontainer which is individually filled with a display fluid. Examples of "display cell" include, but are not limited to, microcups, microcapsules, micro-channels, other partition-typed display cells and equivalents thereof.

In a practical implementation of EPD, the desired images may be black, white, and a number of grey levels (e.g. 2, 4, 16, or 256 grey levels). The black and white colors may be, in general, referred to as first and second color states. The grey levels may be, in general, referred to as intermediate color states.

The amount of data required to define an image is the number of lines in the image times the number of pixel per line times the number of bits required to defined the color. One example is a display with 600 lines×800 pixels per line times 8 bits. The 8 bits defines 256 gray levels. However, the present invention may apply to a display with different combinations of desired pixel images.

Figure 2:
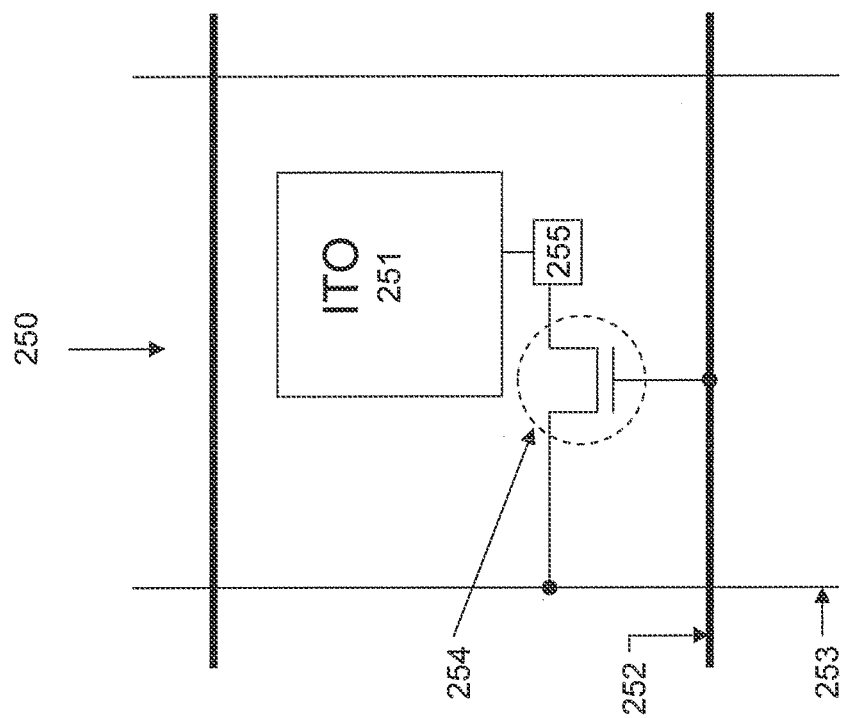
FIG. 2 illustrates the structure of a pixel.

An active matrix driving mechanism is often used to drive a display device. In general, an active matrix display device includes a display unit on which the pixels are arranged in a matrix form. A diagram of the structure of a pixel is illustrated in FIG. 2. Each individual pixel such as element 250 on the display unit is disposed in each of intersection regions defined by two adjacent scanning signal lines (i.e., gate signal lines) 252 and two adjacent image signal lines (i.e., source signal lines) 253. The plurality of scanning signal lines 252 extending in the column-direction are arranged in the row-direction, while the plurality of image signal lines 253 extending in the row-direction intersecting the scanning signal lines 252 are arranged in the column-direction. Gate signal lines 252 couple to gate driver ICs and source signal lines 253 couple to source driver ICs.

More specifically, a thin film transistor (TFT) array is composed of a matrix of pixels and ITO region 251 (a transparent electric conducting film) each with a TFT device 254 and is called an array. A significant number of these pixels together create an image on the display. For example, an EPD may have an array of 600 lines by 800 pixels/line, thus 480,000 pixels/TFT units.

A TFT device 254 is a switching device, which functions to turn each individual pixel on or off, thus controlling the number of electrons flow into the ITO zone 251 through a capacitor 255. As the number of electrons reaches the expected value, TFT turns off and these electrons can be kept within the ITO zone.

Figure 3:
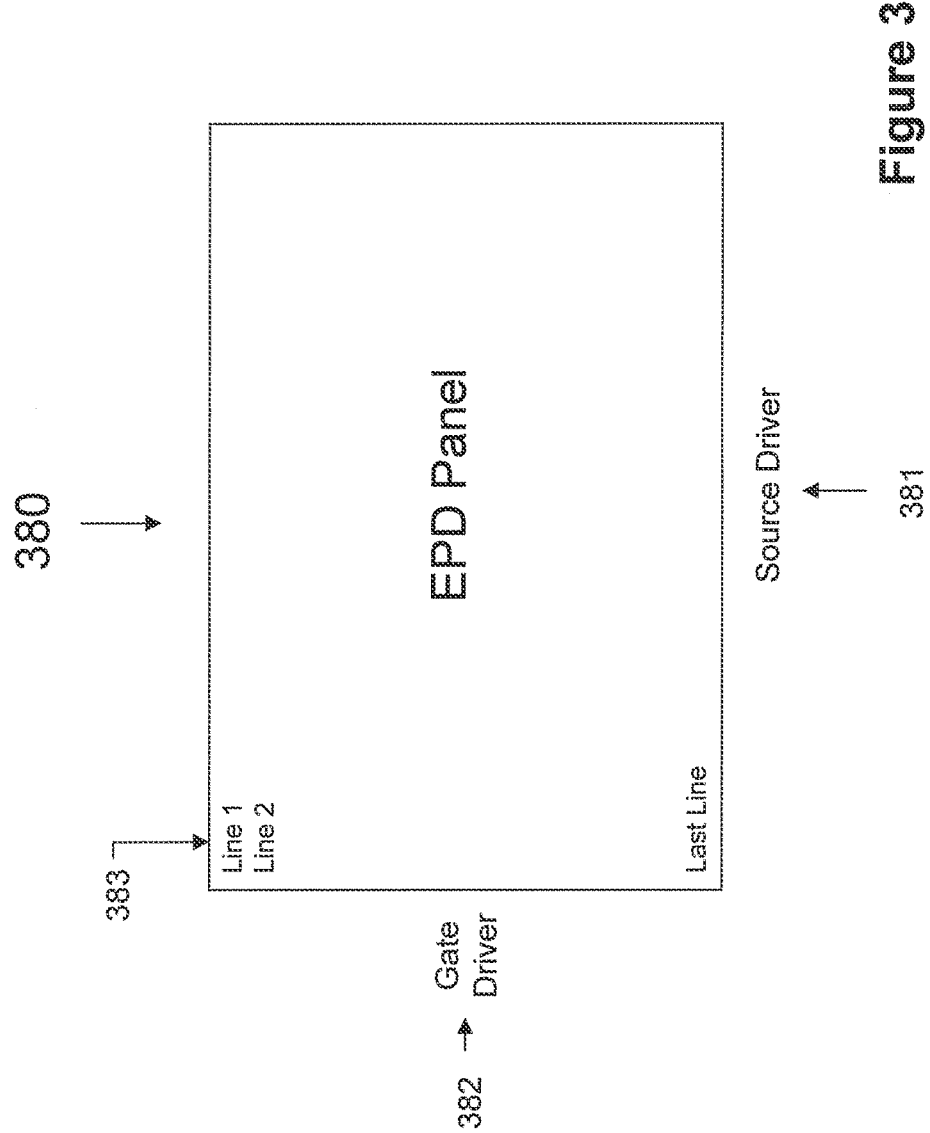
FIG. 3 illustrates an active matrix backplane.

FIG. 3 illustrates an active matrix backplane 380 for an EPD. In an active matrix backplane, the source driver 381 is used to give the proper voltages to the line of the pixels. And the gate driver 382 is used to trigger the update of the pixel data for each line 383.

In practice, charged particles corresponding to a pixel are driven to a desired location by a series of driving voltages which is often referred to as a driving waveform.

Typically, a driving waveform period is 100 msec to 10 seconds, depending upon the quality of a display device, age of the display device, and environmental conditions (e.g., temperature, humidity or lighting conditions).

Figure 4:
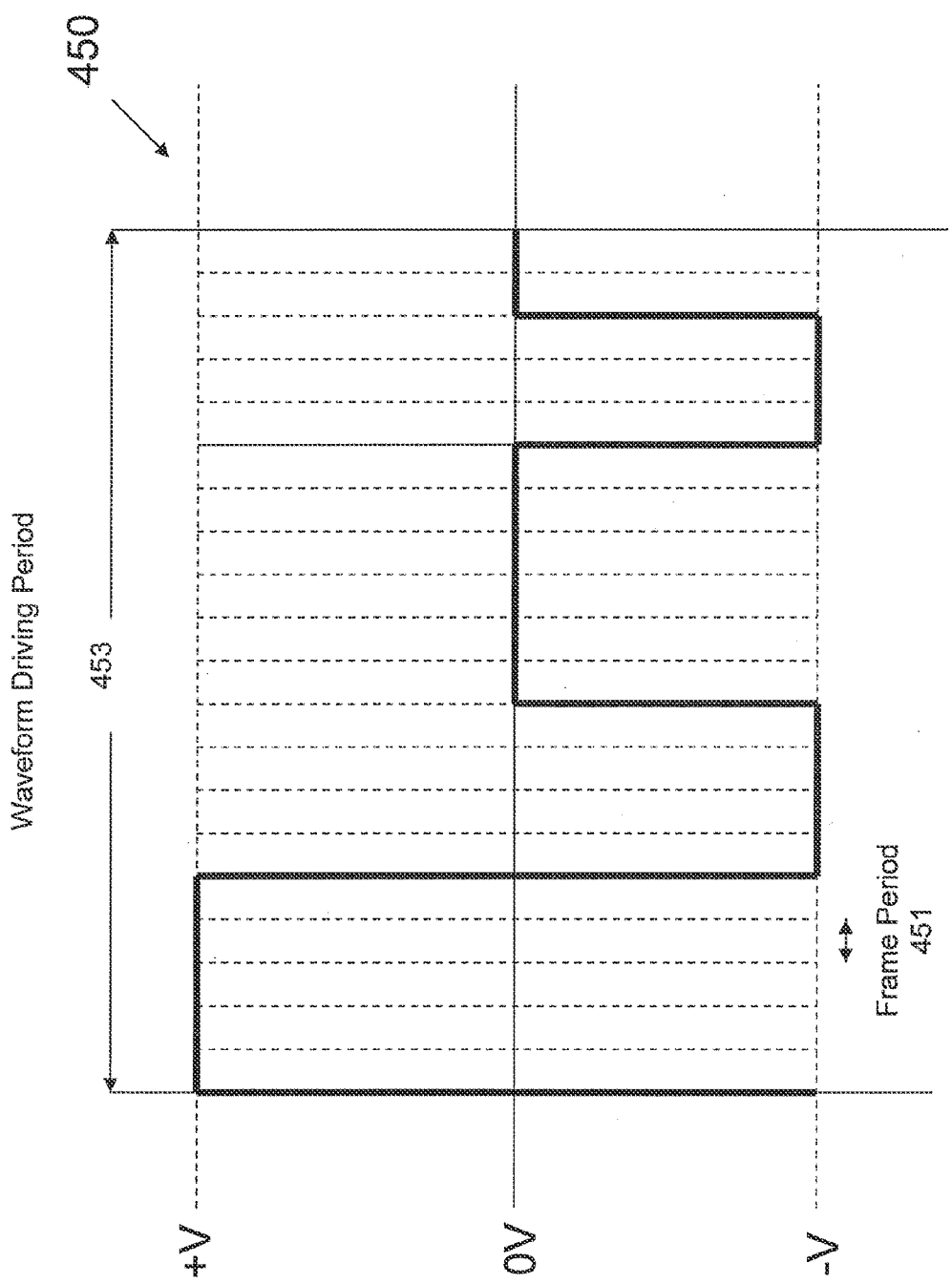
FIG. 4 illustrates a driving waveform.

FIG. 4 shows an example waveform 450 for a single pixel. For driving waveform 450, the vertical axis denotes the intensity of the applied voltages whereas the horizontal axis denotes the driving time. The length of 453 is the driving waveform period.

There are frames within the driving waveform 450 as shown in FIG. 4 and the length of the frame is referred to as a frame period 451.

When driving an EPD on an active matrix backplane, it usually takes many frames for the image to be displayed. The term "frame period" or "frame time" is intended to refer to the interval time during which a voltage is applied to a pixel in order to update an image. For example, during the frame period 451, a voltage of +V is applied to the pixel.

The typical frame time ranges from 2 msec to 100 msec. Therefore, there may be as many as 1000 frames in a waveform period, but typically there are 20-40 frames in a waveform period. A typical frame period is 20 msec (millisecond) and therefore for a driving waveform having a length of 2000 msec, the voltages are applied 100 times to each single pixel.

An image update is carried out line by line. In an example, an EPD may comprise an active matrix of 600 lines of 800 pixels per line. During each frame time, all of the pixels in the image are updated. Hence, there are 600 line updating time periods in a frame period and during each line updating time period, there are 800 pixels to be updated. Therefore the term "line updating time period" is intended to refer to the frame time divided by the number of lines in a display device. If the frame period is 20 msec, then the line updating time period for an image of 600 lines×800 pixels per line would be equal to 20/600=33 μsec (microsecond).

As stated, an EPD requires a series of applied voltages to drive the pigment particles to a desired state. As described, the display controller transmits voltage information, frame by frame, to the TFT backplane of the display, e.g., the source driver IC and the gate driver IC. The gate driver IC selects which line to charge, and the source driver IC provides the appropriate voltage level.

FIG. 5a shows a system 500 which comprises a CPU (computer processing unit) 505, CPU memory 504, a display 501, a display controller 502, image memory 503, and computer bus 506.

The CPU 505 is able to read to or write to CPU memory 504 via computer bus 506. CPU memory 504 is sometimes referred to as the "main memory" in the system.

In a display application, the images are stored in the CPU memory 504. When an image is to be displayed, the CPU 505 sends a request to the display controller 502. CPU 505 then instructs the CPU memory 504 to transfer the image data via computer bus 506 to the display controller 502.

Figure 5B:
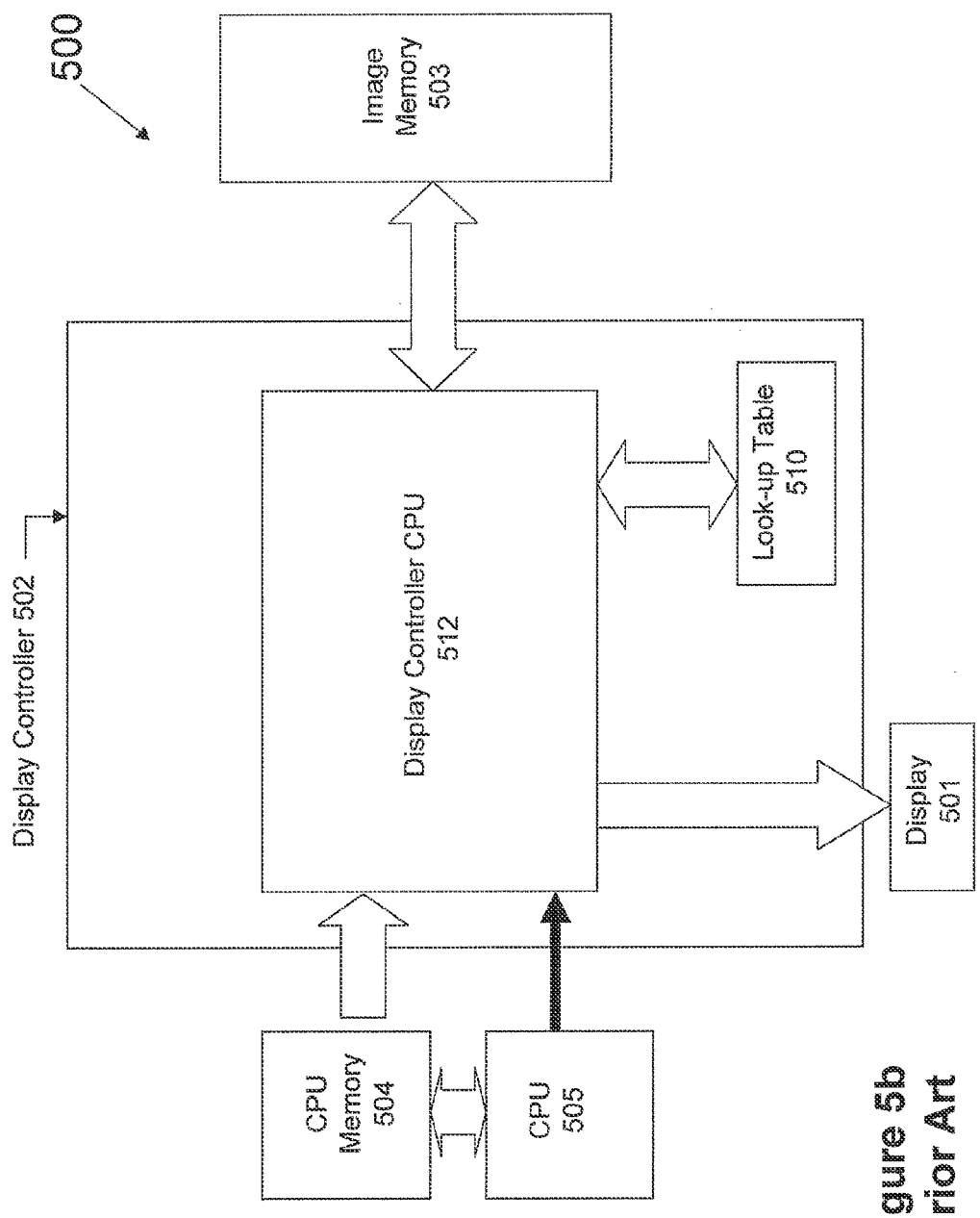
FIG. 5b illustrates the current display controller system.

In the current display controller system as shown in FIG. 5b, the display controller 502 comprises a CPU of the display controller 512 and a lookup table 510.

When an image update is being carried out, the display controller CPU 512 accesses the current image and the next image from the image memory 503 and compares the two images. Based on the comparison, the display controller CPU 512 consults the lookup table 510 to find the appropriate waveform for each pixel. More specifically, when driving from the current image to the next image, a proper driving waveform is selected from the look up table for each pixel, depending on the color states of the two consecutive images of that pixel. For example, a pixel may be in the white state in the current image and in the level 5 grey state in the next image, a waveform is chosen accordingly.

The selected driving waveforms are sent to the display 501 to be applied to the pixels to drive the current image to the next image. The driving waveforms however are sent, frame by frame, to the display.

In this system, while the display controller 512 is busy constantly updating the images, it cannot receive additional new image data from the CPU memory 504 because the memory cannot be read or written to at the same time. The CPU memory 504 has to wait until the display controller 512 finishes updating before the additional new image data may be transmitted. This causes significant slow-down of the entire system.

Figure 6:
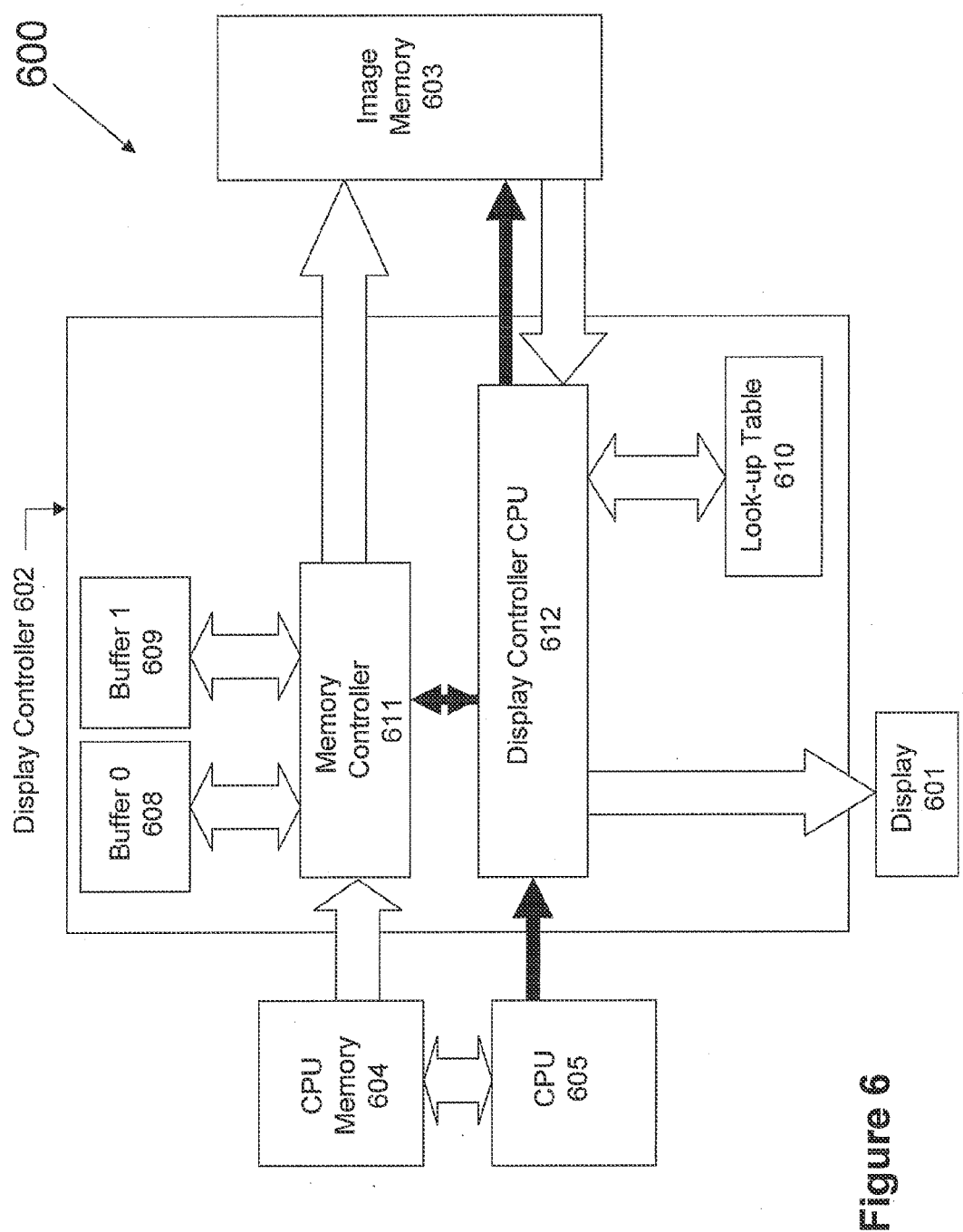
FIG. 6 illustrates a display controller with a memory controller in accordance with an embodiment of the present invention.

FIGS. 6 and 7 illustrate the present invention.

In the present invention, a memory controller 611 and two buffers 608 and 609 are incorporated to solve the delay issue.

As shown in FIG. 6, the display controller 602 of the present invention comprises the display controller CPU 612, memory controller 611, two buffers 608 and 609 and a lookup table 610.

According to the present invention, the new image data may be transmitted to the buffers 608 or 609 as determined by the memory controller 611. Buffer0 608 and buffer1 609 are "ping-gong" or "double" buffers and are implemented to receive image data from the CPU memory 604. The size of the buffer is significantly smaller than the size of data for a single image. For example, it may be about 0.001% to about 10% of the size of the data of a single image.

In practice, while Buffer0 608 is read, buffer1 609 can be written to, and while buffer1 609 is read, Buffer0 608 can be written to. Hence, if buffer0 608 is full, then buffer1 609 may be available to receive image data from the CPU memory 604. With the ping-pong buffers, data in one buffer may be processed while the next set of image data is read into the other buffer.

Once one of the buffers is full, the data in that buffer is available to be processed and transferred to image memory 603. The transferring of the data from the buffer 608 or 609 to the image memory 603 occurs during an idle time which is after the voltages for a line of pixels have been sent to the display and before the waveforms of the next line of pixels are processed.

For the purpose of this invention, the image memory 603 has at least three spaces, e.g., A, B and C. Image memory Spaces A and B are occupied by the images that are being updated. The new image data are then transmitted to image memory Space C. There may be more than three spaces in the image memory.

In summary, the present invention allows the following two steps (A and B) to be sequentially carried out within a "line updating time period".

Step A:
(i) accessing current and next image data from an image memory and comparing the two images,
(ii) finding the appropriate driving waveforms, one for each of the pixels in a given line, from a lookup table,
(iii) forwarding to a display the voltage data to be applied to each of the pixels in said given line; and Step B:
(i) transferring image data from a buffer which is full to the image memory.

The current and next images may be referred to as the first and second images.

In Step A(iii), the display controller CPU 612 provides the voltage data to the source driver IC and the gate driver IC of the display 601.

If neither of the buffers is full, Step B may be skipped.

As described previously, the term "line updating time period" in the present invention is defined as the frame period divided by the number of lines in an image. For example, for an image of 600 lines×800 pixels per line and the frame period is 20 msec, the line updating time would be 33 μsec.

The frame time is an inherent feature of an active matrix TFT driving system and it is usually set at 20 msec.

As shown in FIG. 7a, both Steps A and B are completed within a line updating time period of 33 μsec. In this example, Step A takes only 14 μsec to complete. The speed of Step A is dependent on the bandwidth of the image memory, the display controller processing time, etc. and it is significantly faster than the line updating time, 33 μsec. The present invention takes advantage of the idle time of 19 μsec to transfer the image data from buffer0 608 or buffer1 609 to the image memory 603 per Step B. In other words, there are 19 μsec available in each line updating time period for memory controller 611 to transfer new image data from buffer0 608 or buffer1 609, whichever is full, to the image memory 603. Step B must be completed within 19 μsec.

With the aforementioned approach, CPU 605 may send the data to the buffer0 608 or buffer1 609 at any time and the image data in the buffers may move to the image memory 603 at a regular interval.

Figure 7B:
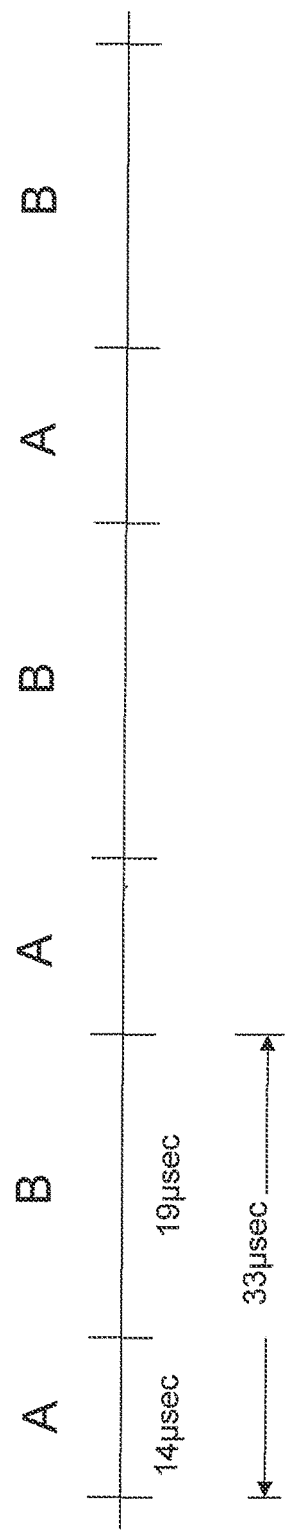
Figure 7C:
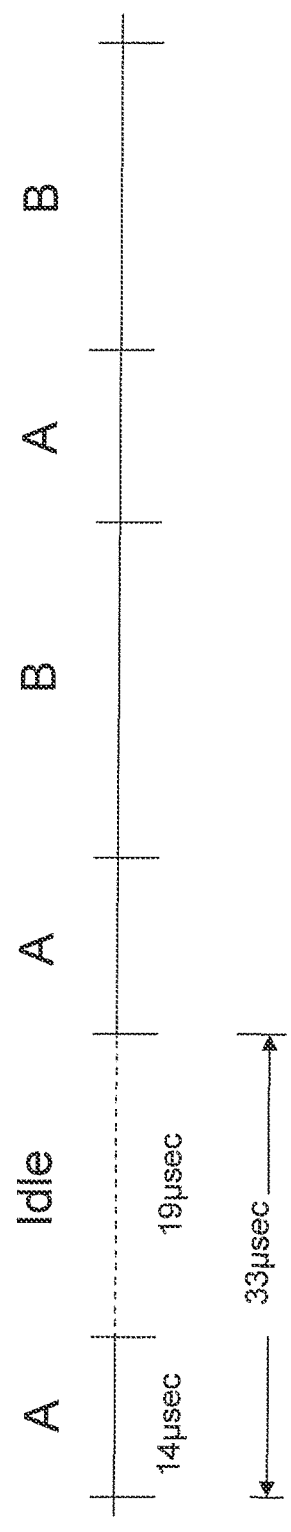

As stated above, the data in a buffer is transferred to the image memory only when the buffer is full. In FIG. 7b, it is shown that if in every line updating time period, there is one buffer that is full, the Steps A and B will be carried out in an interleaving manner (i.e., alternating order). If during a line updating time period, none of the two buffers is full, Step B is skipped, as shown in FIG. 7c.

The method as shown in FIGS. 7b (Steps A and B carried out in a interleaving manner) and 7c (Step B is skipped in a line updating time period) may be carried out in more than one frame time or more than one waveform driving period.

It is understood that it is also possible to transfer data from a buffer to the image memory when it is not full. However, in practice, it is less preferred.

In order to avoid both buffers being full at the same time, the writing speed from CPU 605 to the buffers must be calculated and controlled.

Although the foregoing disclosure has been described in some detail for purposes of clarity of understanding, it will be apparent to a person having ordinary skill in that art that certain changes and modifications may be practiced within the scope of the appended claims. It should be noted that there are many alternative ways of implementing both the method and system of the present invention. Accordingly, the present embodiments are to be considered as exemplary and not restrictive, and the inventive features are not to be limited to the details given herein, but may be modified within the scope and equivalents of the appended claims.

What is claimed is:

1. A method of transferring image data for a display device assembly, which comprises
   a CPU memory;
   a display controller comprising two buffers, a memory controller and a look-up table;
   an image memory; and
   a display device;
   wherein new image data are transmitted from the CPU memory to the buffers as determined by the memory controller,
   which method comprises:
   (A) (i) accessing current and next image data from the image memory and comparing the two images,
      (ii) finding appropriate driving wave forms, one for each of the pixels in a given line, from the look-up table,
      (iii) forwarding to the display device voltage data of the appropriate driving waveforms to be applied to each of the pixels in the given line;
   (B) during an idle time transferring image data from one buffer of the two buffers which is full to the image memory and simultaneously transferring image data from the CPU memory to another buffer of the two buffers, wherein the idle time is after voltages for a line of pixels have been sent to the display device and before waveforms of a next line of pixels are processed, wherein both steps A and B are completed within a line updating time period, and
   (C) repeating steps A and B in an alternating manner and step B is present only when one of the buffers is full.

2. The method of claim 1, wherein step C is carried out in more than one frame period.

3. The method of claim 1, wherein step C is carried out in more than one waveform driving period.

4. The method of claim 1, wherein said display device is an electrophoretic display.

5. The method of claim 1, wherein said line updating time period is calculated from a frame period divided by the number of lines of pixels.

6. The method of claim 1, wherein the two buffers operate as ping-pong buffers.

7. The method of claim 1, wherein said image memory has at least three spaces.

8. The method of claim 1, wherein a size of the buffers is about 0.001% to about 10% of a size of data of a single image being displayed by the display device.

* * * * *